April 14, 1931. H. J. M. HOWARD 1,801,157
COUPLER
Filed June 1, 1925
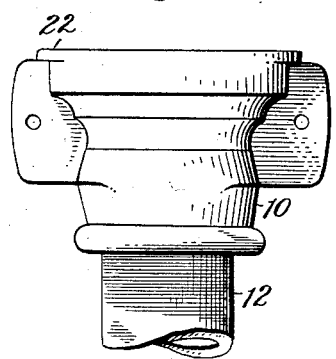
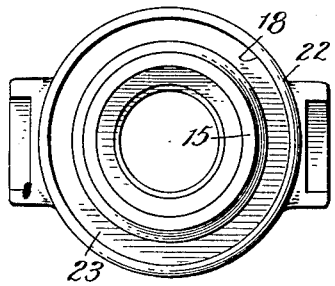
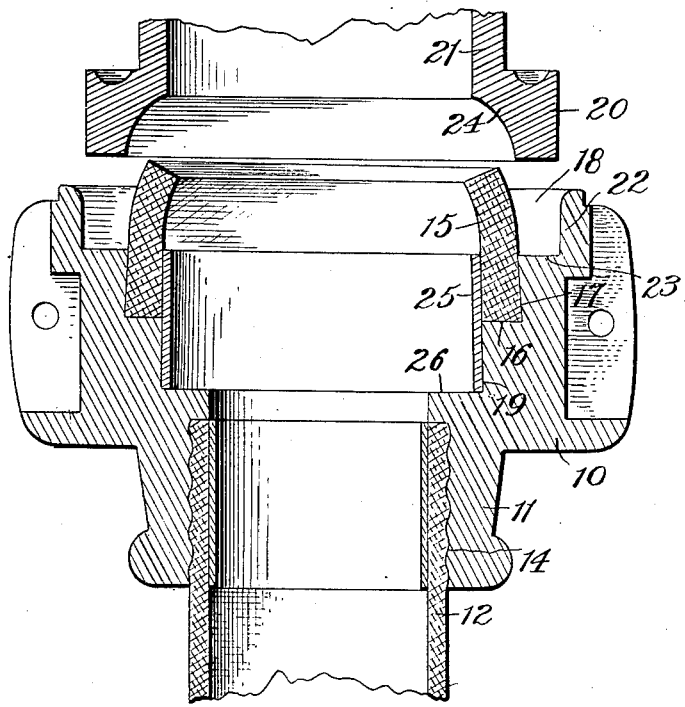
Witness:
Jas E Hutchinson
Inventor:
Henry J. M. Howard,
By H. H. Snelling
Attorney Patented Apr. 14, 1931

1,801,157

UNITED STATES PATENT OFFICE

HENRY J. M. HOWARD, OF WASHINGTON, DISTRICT OF COLUMBIA

COUPLER

Application filed June 1, 1925. Serial No. 34,140.

This invention relates to fire hose couplings and has for its principal object the provision of a method of assembling a gasket with a coupler casting in such fashion that the gasket cam be renewed without injuring or defacing the casting in any way.

A further object of the present invention lies in the provision of a coupling member having an annular gasket secured thereto by frictional contact on two opposite sides, the frictional contact being obtained by means of an expanded non-resilient ring.

A still further object of the present invention lies in the specific form of the coupler casting.

For a great many years the coupler used as standard fire equipment of many cities has been of the Jones type in which the coupling carries at its lower end either a metropolitan fire hose usually of linen with an outer and an inner lining of rubber, or a much smaller diameter local hose line, the latter usually being of a cloth fabric without the rubber lining or covering. This type of coupler is illustrated in the Clay Patent No. 259,369, dated June 13, 1882.

In use, as is well known, the Jones couplers have a pair of pivoted, spring pressed hook fasteners or catches on each side so that by snapping the coupler upward over the standpipe nipple the hose is secured to the main water service line or if there is a local hose already on the nipple (as there usually is) the two snap catches or hooked latches are held back against their springs, the local hose dropped out of position, and the coupling holding the fire hose of larger diameter snapped into place.

In all these old Jones couplings it has been the invariable custom to imbed in the sand core, the copper ring or annular angle piece and to cast the brass coupler about this copper ring which latter consequently is permanently secured to the brass member. A plurality of seats of increasing diameter are formed in the coupler body and a gasket placed in the middle seat and then the partly shaped copper member which is formed of a cylinder having an integral, annular flange, is expanded to hold the gasket in place. With such a coupler, destructions of the gasket necessitates the scrapping of the coupler, since there is no possible way to take out the gasket and replace it at less cost than the price of a new coupler, inasmuch as the ring and body are one integral piece.

In my present invention I retain all of the good points of the Jones coupler and only alter the copper ring and one single vertical wall that is, instead of having a cylindrical surface where the copper ring joins the casting I undercut this surface and in my construction not only do I secure the advantages of replacement of the gasket but I am enabled to use gasket tubing and copper tubing since each of these two members before being assembled may be and preferably is a hollow cylinder.

In the drawings:—

Figure 1 is a front elevation of a coupler embodying my invention.

Figure 2 is a top plan view of the casting alone.

Figure 3 is an enlarged radial section, showing the gasket in place.

The casting 10 is of the old and well-known form as far as Figure 1 is concerned. The portion 11 receives the fire hose 12 which is held in place by the inner ribbed, corrugated or otherwise roughened surface 14. The gasket 15 seats firmly on a surface 16 and thruout a portion of its peripheral surface seats snugly into an undercut 17, the gasket extending above the bottom of the groove 18 which receives the lower annular flange 20 of the stand pipe nipple 21, this groove being bounded by the wall of the upper peripheral flange 22 of the coupler body, the seat 23 which is the uppermost of the three annular concentric seats or shoulders, the edges of which bound the undercuts 17 and 19, and by the free extending portion of the gasket.

This nipple 21 is provided with an inner zone shaped guiding surface 24 which cams inward the annular gasket 15 so that the nipple and coupling form a water tight joint. Inward movement of the lower half of the gasket 15 is prevented by a short section of copper tubing 25 which before it is expanded fits loosely in the chamber formed by the seat 26 and the undercut 19. The copper section or ring 25 is preferably somewhat less in axial length than is the gasket, the copper ring 25 reaching approximately to the level of the bottom 23 of the groove 18 while the gasket 15, which before being expanded fits rather loosely in its seat, is of a height to extend approximately to the level of the top of the casting 10, usually however, extending slightly above the top of the casting. The ring fits just a little snugly within the gasket before being expanded and consequently distends one half of the hollow cylindrical gasket which therefore draws inward at its free end, bowing or shrinking inward toward the axis, making it easier to push the assembled gasket unit in to its ledge, i. e., the shoulder formed by the seat 16 and the undercut 17.

To assemble, the cylindrical copper retaining member is slipped within the cylindrical gasket by hand or otherwise, the gasket as stated being merely a section cut from a long piece of tubing preferably of rubber composition as customary in this art. The assembled ring and gasket is then dropped into the gasket's seat. The ring is pushed downward into firm engagement with the lower annular seat 26 and is then expanded radially outward into firm contact with the wall of the undercut 19. This action causes the upper portion of the gasket 15 to assume a rounded, spherical or rather zone shape which facilitates the action of the similar surface 22 of the coupling, in the telescoping of this gasket to make a proper joint.

In case of damage to the gasket it is merely necessary to destroy the ring 25 which being copper is soft and may be removed without much difficulty. The gasket may then readily be pulled out and the coupler casting or body is in its initial form and may be assembled with another new gasket and ring in the manner heretofore outlined.

What I claim is:—

1. The method of assembling a gasket with a coupler which consists in fitting a cylinder of non-resilient metal within the gasket to project therefrom at one end, placing the assembled gasket and cylinder within the coupler and radially expanding the cylinder to bind the gasket against the coupler wall to secure the gasket and ring within the coupler.

2. A fire hose coupler unit consisting of a body having a hose receiving cylindrical portion, an annular seat for a gasket and a substantially cylindrical wall rising from said seat, a gasket of rubber tubing on said seat and engaging said wall and extending beyond its edge, a readily removable retaining metal ring in engagement with the body and with a portion only of the inner wall of the gasket, said gasket and ring being removable from the body without injury to the body, whereby a new gasket may be assembled with the old body upon deterioration of the gasket.

In testimony whereof I affix my signature.

H. J. M. HOWARD.